(12) United States Patent
Dimitrov-Kuhl et al.

(10) Patent No.: US 8,310,685 B2
(45) Date of Patent: Nov. 13, 2012

(54) PARAMETERIZED OPTICAL SYSTEM AND METHOD

(76) Inventors: Klaus-Peter Dimitrov-Kuhl, Hillsborough, NJ (US); Valmore J. Forgett, III, Ann Arbor, MD (US)

( * ) Notice: Subject to any disclaimer, the term of this patent is extended or adjusted under 35 U.S.C. 154(b) by 1106 days.

(21) Appl. No.: 12/191,746

(22) Filed: Aug. 14, 2008

(65) Prior Publication Data

US 2009/0046303 A1 Feb. 19, 2009

Related U.S. Application Data

(60) Provisional application No. 60/956,660, filed on Aug. 17, 2007.

(51) Int. Cl.
*G01B 11/14* (2006.01)
(52) U.S. Cl. ......................................... 356/625
(58) Field of Classification Search .................. 356/432, 356/445
See application file for complete search history.

(56) References Cited

U.S. PATENT DOCUMENTS

| | | | | |
|---|---|---|---|---|
| 2,341,658 A | * | 2/1944 | Salani | 362/297 |
| 3,492,474 A | * | 1/1970 | Hishinuma et al. | 362/350 |
| 3,645,606 A | * | 2/1972 | La Vantine | 359/853 |
| 4,153,929 A | * | 5/1979 | Laudenschlarger et al. | 362/348 |
| 4,683,525 A | * | 7/1987 | Camm | 362/346 |
| 4,697,227 A | | 9/1987 | Callahan | |
| 4,794,503 A | * | 12/1988 | Wooten et al. | 362/346 |
| 5,404,869 A | * | 4/1995 | Parkyn et al. | 126/699 |
| 5,971,569 A | * | 10/1999 | Smith et al. | 362/304 |
| 6,646,813 B2 | | 11/2003 | Falicoff et al. | |
| 6,688,758 B2 | | 2/2004 | Thibault | |
| 7,178,941 B2 | | 2/2007 | Roberge et al. | |
| 7,181,378 B2 | | 2/2007 | Benitez et al. | |
| 7,580,192 B1 | * | 8/2009 | Chu et al. | 359/641 |
| 7,651,246 B2 | * | 1/2010 | Bollea et al. | 362/329 |
| 7,952,017 B2 | * | 5/2011 | Repetto et al. | 136/246 |
| 2007/0058138 A1 | * | 3/2007 | Repetto et al. | 353/53 |
| 2008/0106910 A1 | * | 5/2008 | Bollea et al. | 362/545 |
| 2009/0165842 A1 | * | 7/2009 | McDonald et al. | 136/246 |

OTHER PUBLICATIONS

PCT International Search Report and Written Opinion mailed on Jul. 8, 2009, for PCT/US2008/09808.

* cited by examiner

*Primary Examiner* — Roy M Punnoose
(74) *Attorney, Agent, or Firm* — Kenyon & Kenyon LLP

(57) ABSTRACT

A system for segmented parametric optimization of emissions from a light source, including a light source emitting light rays at a plurality of angles and an optic for directing light rays from the light source, the optic including at least one annular segment, the at least one annular segment being configured to optimize a characteristic of the emitted light rays, and a method for using and manufacturing the system.

17 Claims, 14 Drawing Sheets

PARAMETERIZED OPTICAL SYSTEM AND METHOD

CROSS-REFERENCE TO RELATED APPLICATIONS

The present application claims the benefit of priority to U.S. Provisional Application No. 60/956,660, filed on Aug. 17, 2007, which is expressly incorporated herein in its entirety by reference thereto.

FIELD OF THE INVENTION

The present invention relates to a system and a method for segmented parametric optimization of optical shapes and volumes to direct the emissions from a light source.

BACKGROUND INFORMATION

Standard optical systems having standard lenses have been developed around the assumption that a light emitter constitutes a point light source, having no width or diameter. As a result, the standard lens equation, the basis for all imaging optical design, is a simple equation that determines the curve of a standard lens. The standard lens equation is a function of the thickness of the lens, the distance (R) from the central axis of the lens, the radius of the curvature (roc) of the lens, the sign factor γ (gamma) having a value of 1 or −1 so as to indicate positive and negative radii of curvatures, respectively, and the conic constant (conic):

$$zStandardLens = LensThickness + \frac{roc - \gamma\sqrt{roc^2 - (1 + conic)R^2}}{1 + conic}$$

FIGS. 1a and 1b show the standard lens curve of the prior art. FIG. 1a shows an exemplary standard lens curve on a two-dimensional axis, having a LensThickness of 3 millimeters, an roc of −4 millimeters and a conic of 0.5. FIG. 1b shows a standard lens 11 according to the curve of FIG. 1a, having lines of curvature 12. It is well known in the field that the lens of an optical device can be manufactured with refraction or absorption characteristics that are a function of the wavelength of the incident light. Further, it is well known in the field that the lens of an optical device can made of a material having a temperature coefficient of expansion. Likewise, it is well known in the field that the face of any lens can be manufactured to be reflective, anti-reflective, partially reflective, transmissive or scattering to any degree.

Light-Emitting Diodes (LEDs), in particular High-Brightness LEDs (HBLEDs), produce a large amount of white light, on the order of about 100-200 lumens for commercial devices, with great efficiency HBLEDs are becoming more affordable and have the capacity to replace conventional light bulbs and compact fluorescent lighting in everyday use. HBLEDs are small, but not point-source, light emitters, often having a light-emitting area on the order of about 1 square millimeter. HBLEDs are generally robust and are constructed to survive relatively rough, harsh conditions, unlike conventional light bulbs and compact fluorescent lighting. Emission of light by HBLEDs is Lambertian, and as such they emit light in all directions. Further, the emissions from HBLEDs are complicated by reflections in the adjacent features of the HBLED package which must be considered. Harnessing the powerful emissions of light from HBLEDs can aid in the realization of greater efficiency and productivity in lighting.

The use of standard lenses and reflectors to optimize the emission of light from LEDs and other broad or extended distribution light sources has not satisfied the full potential. The methods for harnessing the emitted light from an LED generally fall into one or more of three categories; refractive, reflective and TIR reflective. Refractive lenses are molded around an LED according to the standard lens equation. Reflective devices use parabolic reflectors, with a light emitter at the center, to direct light. FIG. 1c shows a standard reflector lens of the prior art. The standard reflector lens 13 has light source 5, curved wall 14 and, in some cases, flat top surface 15 to prevent dirt and other contaminants from entering the optics. Total Internal Reflection (TIR) devices use a similar parabolic reflection system, but use a TIR parabolic reflector called a TIR lens. FIG. 1d shows a standard TIR lens of the prior art. The standard TIR lens 16 has light source 5, straight wall 17 and flat top surface 18.

In order to capture the maximum amount of emission, lenses for HBLEDs must be in close proximity to the HBLED. HBLEDs, having Lambertian emission, radiate in all directions. A lens or other optic device that is situated too far from an HBLED, and therefore outside of intimate contact, will not properly capture all of the emission. Lenses for HBLEDs are generally situated on the order of about 1 to 3 millimeters from the light source. Standard lenses of the prior art generally have a slow, circular variation, as shown in FIGS. 1a and 1b. This form is very limiting and not conducive to the broader area light emission of the HBLED. The nature of the HBLED light source is such that a regular, slow, circular variation in a lens will not adequately reflect or refract the light from a position on the light source other than the singular point to which the lens is trained. The wide source of light cannot be properly accommodated by the standard lens form.

In the example of the reflective device using a parabolic reflector, light is well-concentrated in the center beam. Around the beam, however, exists a broad roll-off zone. In this roll-off zone, light of a much lower intensity is distributed. This roll-off zone consists of light that is not being used to more efficiently illuminate the center beam, nor is it bright enough to properly illuminate the surrounding zone. It is wasted light.

Because LEDs are not point light sources, the standard lens equation is limited in its usefulness for illumination applications with LEDs. The standard lens is too spherical; only the light from the center point of the lens is optimized. Faster and more specialized spatial variation is required to direct the broad portions of the LED emission. The same is true for all emitted radiation from other extended distribution sources.

SUMMARY OF THE INVENTION

It is therefore an object of the present invention to provide a segmented parametric optimization device that provides greater flexibility and freedom in optic design to more fully harness light emission.

The device of the present invention includes a lens that is divided into segments. Each segment is configured according to a modified Gaussian equation, such that the overall curve of the lens is able to direct the light rays incident from the light source to create a brighter and more uniform emission than the devices of the prior art. The modified Gaussian equation, called herein the Super Gaussian Radial (SGR) equation, is useful in conjunction with the measured output of a light source in determining the curve of an optic that will achieve the object of the present invention.

The flexibility and freedom of the SGR equation allows for optimization of the emitted light on a segmented basis. The output of a light source can be divided into angular or spatial segments or regions. The optic of the present invention is likewise divided into angular or spatial segments or regions that correspond to the angular or spatial segments or regions of the light source output. The segments of the optic can then be optimized for the specific segment of the light source output to which it is associated, according to the SGR equation. Such an optimized optic is a Segmented Parametric Optimized (SPO) optic. Once all segments are configured, they are re-constructed into a complete optic. The complete optic is fabricated using injection molding techniques. The result is a segment-specific optic curve. The segment-specific nature of the optic yields superior results to the "one-size-fits-all" approach of the standard lens equation.

An exemplary embodiment of the present invention is a system for segmented parametric optimization of emissions from a light source, including a light source emitting light rays at a plurality of angles and an optic for directing light rays from the light source, the optic including at least one annular segment, the at least one annular segment being configured to optimize a characteristic of the emitted light rays.

In a further exemplary embodiment of the present invention, the light source includes a light-emitting diode.

In a further exemplary embodiment of the present invention, the optic includes at least one angular segment being reflecting. In a further exemplary embodiment of the present invention, the optic includes at least one annular segment being a total internal reflector. In a further exemplary embodiment of the present invention, the optic includes at least one annular segment being refracting. In a further exemplary embodiment of the present invention, the optic includes at least one annular segment being reflecting and at least one annular segment being refracting.

In a further exemplary embodiment of the present invention, the at least one annular segment is configured according to a Super Gaussian Radial curve. In a further exemplary embodiment of the present invention, the at least one annular segment is configured as a function of at least one of LensThickness, shape, height, oneOverE and offSet.

In a further exemplary embodiment of the present invention, the optic is radially asymmetric.

In a further exemplary embodiment of the present invention, the characteristic optimized by the configuration of the at least one annular segment is at least one of uniform brightness, peak brightness, coupling efficiency, number of bounces of light on the optic, color balance, reflections and ghosting.

In a further exemplary embodiment of the present invention, the optic is made of one of PMMA and polycarbonate.

In a further exemplary embodiment of the present invention, the optic includes a front face and a back face, the front and back faces each including the at least one annular segment.

In a further exemplary embodiment of the present invention, the system further includes a first beam steering prism and a second beam steering prism situated downstream of the output of the optic, the first and second beam steering prisms each having a front face and a back face, the front and back faces of the first and second beam steering prisms being situated at an angle to the central axis of the system. In a further exemplary embodiment of the present invention, the first and second beam steering prisms are mechanically rotated about the central axis.

Another exemplary embodiment of the present invention is a method for configuring an optic for segmented parametric optimization of emissions from a light source, including measuring emissions from a light source, compiling data measured into a ray database, defining a merit function for the optimization of a characteristic of the emissions from the light source, modeling an output of an optic whose shape is defined by a parameterized curve having at least one annular segment, varying parameters of the parameterized curve of each of the at least one annular segment, measuring the modeled output until the characteristic is optimized, and forming an optic according to optimal parameters of the at least one annular segment of the parameterized curve.

In a further exemplary embodiment of the present invention, the step of varying the parameters of the parameterized curve of the at least one annular segment is performed on more than one of the at least one annular segment simultaneously.

In a further exemplary embodiment of the present invention, the step of forming an optic according to optimal parameters of the at least one annular segment of the parameterized curve further includes forming the optic with a reflective wall and at least one refractive lens.

Another exemplary embodiment of the present invention is a method for manufacturing a system for segmented parametric optimization of emissions from a light source, the method including determining a parameterized curve of an annular segment of an optic, forming a metallic tool according to the parameterized curve of the annular segment, and routing a cavity in a metal panel to form a mold for the annular segment.

In a further exemplary embodiment of the present invention, the method further includes repeating the determining, forming and routing steps for at least one additional mold, and tiling together the molds to form a master array of molds. The master array of molds may then be used to manufacture many optics concurrently.

BRIEF DESCRIPTION OF THE DRAWING

FIG. 1$b$ shows a standard lens of the prior art.
FIG. 1$c$ shows a standard reflector lens of the prior art.
FIG. 1$d$ shows a standard TIR lens of the prior art.

DETAILED DESCRIPTION

Figure 2:
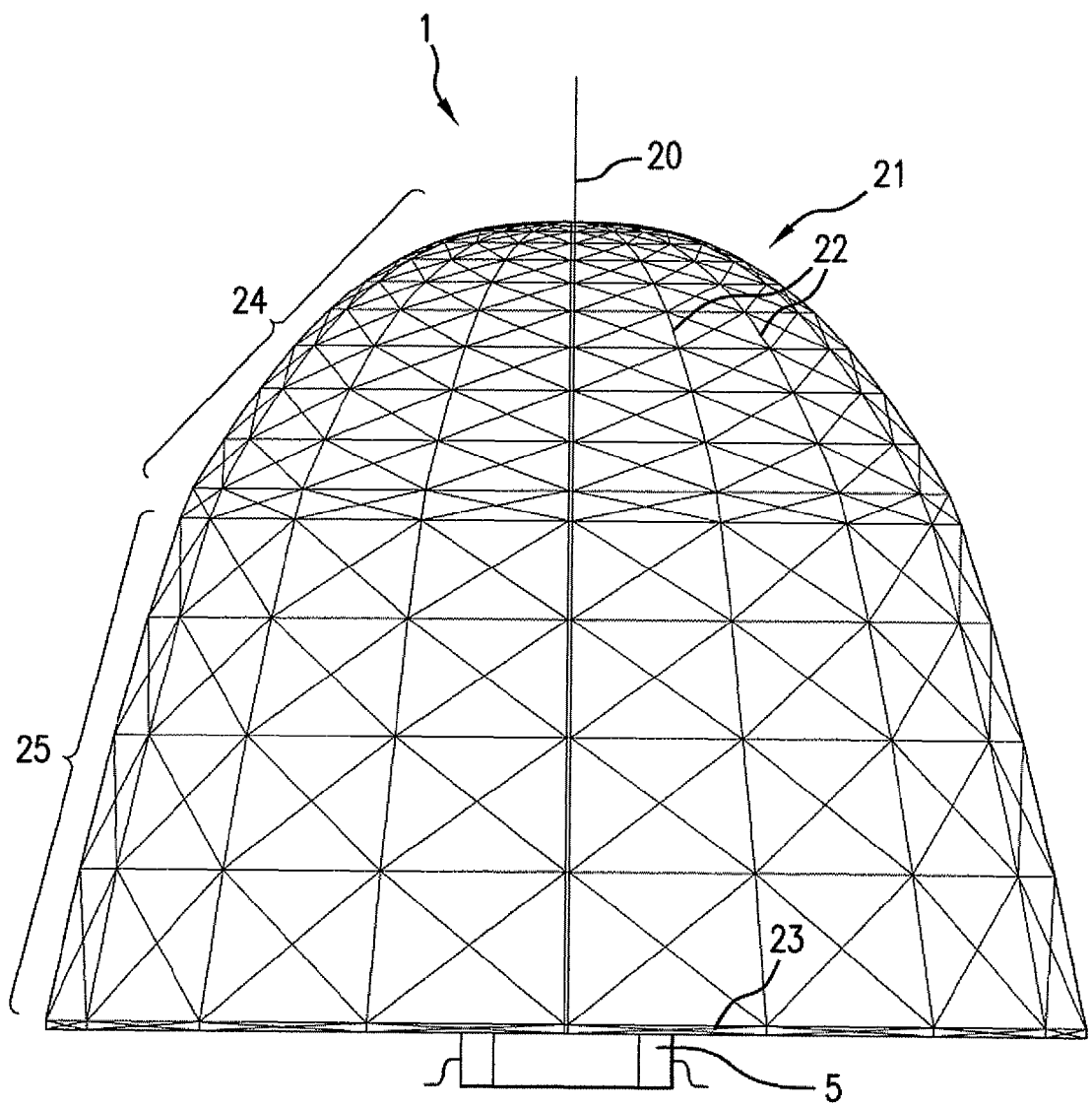
FIG. 2 shows an exemplary embodiment of the present invention, including a two-segment SPO optic.

FIG. 2 shows an exemplary embodiment of the device of the optical system 1 of the present invention. Segmented Parametric Optimization (SPO) optic 21 is a two-segment SPO optic. SPO optic 21 has a front side 23, a first lens segment 24 and a second lens segment 25. For clarity, lines of curvature 22 and central axis 20 are indicated. SPO optic 21 is situated over light source 5. Light source 5 emits light rays (not depicted) in all directions about central axis 20. The light rays strike the interior of SPO optic 21 and pass through SPO optic 21. The first and second lens segments 24 and 25 are each configured so as to affect the light rays from the light source in a manner that produces a light distribution of a particular characteristic such as, for example, uniform brightness or high peak brightness.

Figure 3:
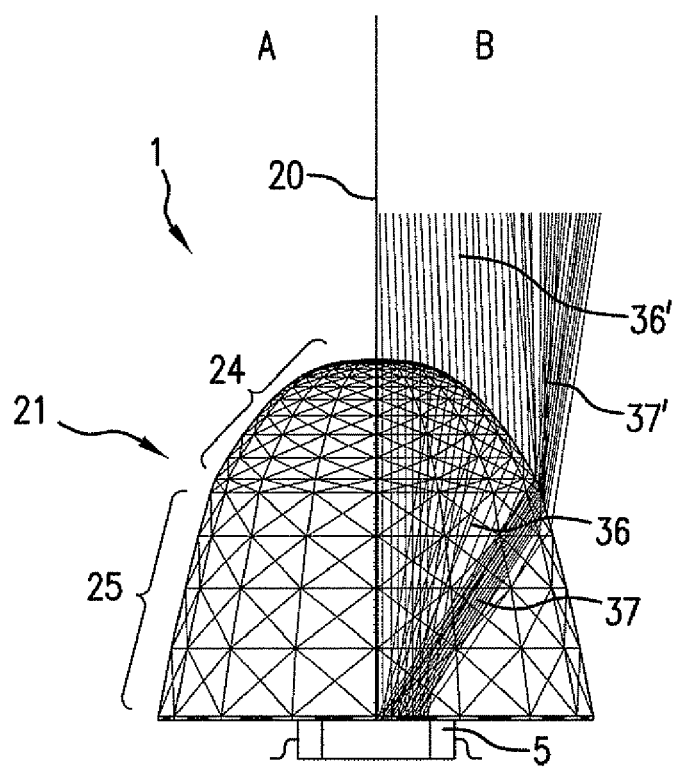
FIG. 3 shows a two-dimensional depiction of an exemplary embodiment of the present invention, including the path of emitted light rays.

FIG. 3 shows a two-dimensional rendering of the exemplary embodiment of the device of the optical system 1 of the present invention, having two sides A and B. Light source 5 emits light rays in all directions about a central axis 20, inside of two-segment SPO optic 21 having first and second lens segments 24 and 25. In the case of an LED light source, light source 5 has an area on the order of about 1 square millimeter. For simplicity, only light rays emitted to side B of the optical system 1 are depicted. The Lambertian emission from the LED is pulled into a 45 degree angle about the central axis 20 by the refractive index of the base of the SPO optic 21. Further, for simplicity, though in reality some overlap exists, the light rays are represented as divided into sections. Light source 5 emits inner light rays 36 and outer light rays 37. Once inner and outer lights rays 36 and 37 are emitted from light source 5, inner and outer lights rays 36 and 37 strike the interior of SPO optic 21 at first and second lens segments 24 and 25. Inner and outer lights rays 36 and 37 are then refracted by first and second lens segments 24 and 25, respectively, of SPO optic 21. Refracted inner and outer lights rays 36' and 37' are then emitted from SPO optic 21. Once refracted via SPO optic 21, refracted inner and outer lights rays 36' and 37, form a distribution of a desired characteristic such as, for example, uniform brightness or high peak brightness.

To determine the optic curve that will optimize output from a light source, computer simulations are useful. Optical modeling allows a user to measure the light distribution resulting from a given optic curve. To create an optical model of an LED, optical ray information can be measured over the entire hemisphere of LED's emission space. The intensity and the spectrum of the emission can be measured as a function of position in the emission space. This information is compiled in an optical profile, which is then converted into a ray database. The ray database describes all of the emission characteristics of the LED. From this database, the SGR equation can be used to model the effect of an SPO optic on the emission from the LED. Computer programs, developed specifically for simulating the results of the present invention, can simulate the testing of many different SGR optics having different combinations of values for the SGR parameters so as to determine the SGR optic with the output optimized according to the user's preference.

The derivation of the equations used to configure the optics of the present invention will now be described. In order to design an optic having a more rapid spatial variation, a modified Gaussian equation is used to describe a curve in a two-dimensional plane of x- and z-axes. The portion of this two-dimensional curve that resides in the positive quadrant of the x- and z-axes is then rotated about the z-axis by $2\pi$ radians to create a three-dimensional curve.

This first modified Gaussian equation (SG1) begins with a Super Gaussian equation that is modified to incorporate the variable offset:

$$zSuperGaussian1 = LensThickness \times e^{-\left(\frac{|x-offSet|}{oneOverE}\right)^{shape}}$$

In this equation, LensThickness is the starting thickness of the entire lens. The variable x describes the distance along the x-axis from the center axis of the lens. OffSet is the distance by which the bisection of the curve is displaced from the z-axis. Shape is a variable, usually, but not limited to, on the order of between 1 and 20, that determines the shape of the curve. To prevent imaginary results, the absolute value of (x—offset) is taken. By taking the absolute value of (x—offset), the value of offset can be used as a parameter in determining the curve of the lens. OneOverE is a traditional characteristic of a Gaussian curve; it is the point on the x-axis at which the Gaussian curves having various values for the shape variable will converge, irrespective of the value of the shape variable.

The equation may be modified a second time to make the form radially symmetric by adding the third dimension, y (SG2):

$$zSuperGaussian2 = LensThickness \times e^{-\left(\frac{|\sqrt{x^2+y^2}-offSet|}{oneOverE}\right)^{shape}}$$

The equation may be modified a third time to incorporate the multiplicative scale factor of height (SG3):

$$zSuperGaussian3 = LensThickness + height \times \left( e^{-\left(\frac{|\sqrt{x^2+y^2} - offSet|}{oneOverE}\right)^{shape}} - e^{-\left(\frac{|offSet|}{oneOverE}\right)^{shape}} \right)$$

and which subtracts the value of SG3 at x=0 and y=0. Subtracting the value of SG3 at x=y=0 preserves sag in the lens curve by maintaining the highest point in the lens curve at the center axis. In the SG3 equation, height is used purely in a mathematical sense; in and of itself height has no bearing on the height of the lens of the actual device. Height, in the sense of this equation, is used to describe the steepness of the curve by describing a fictitious height extending into the negative z-axis, as more fully described below with respect to FIG. 5.

Figure 4:
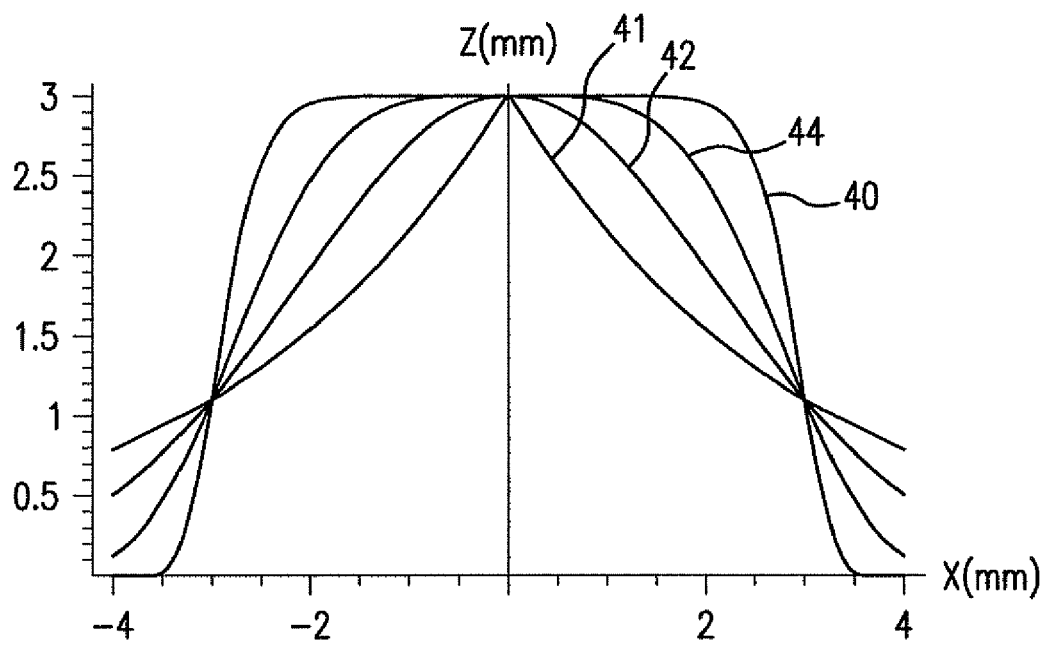
FIG. 4 shows four curves of a modified Super Gaussian equation, each having a different value for the shape variable.

FIGS. 4, 5, 6 and 7 illustrate the affect of these variables on the resulting curve. FIG. 4 shows four curves according to the first modified Super Gaussian equation, SG1. Each curve has a different value for the shape variable; curve 41 corresponds to a shape of 1, curve 42 corresponds a shape of 2, curve 44 corresponds to a shape of 4, and curve 40 corresponds to a shape of 10. As the shape variable reaches higher values, the curve approaches the form of a step function.

Figure 5:
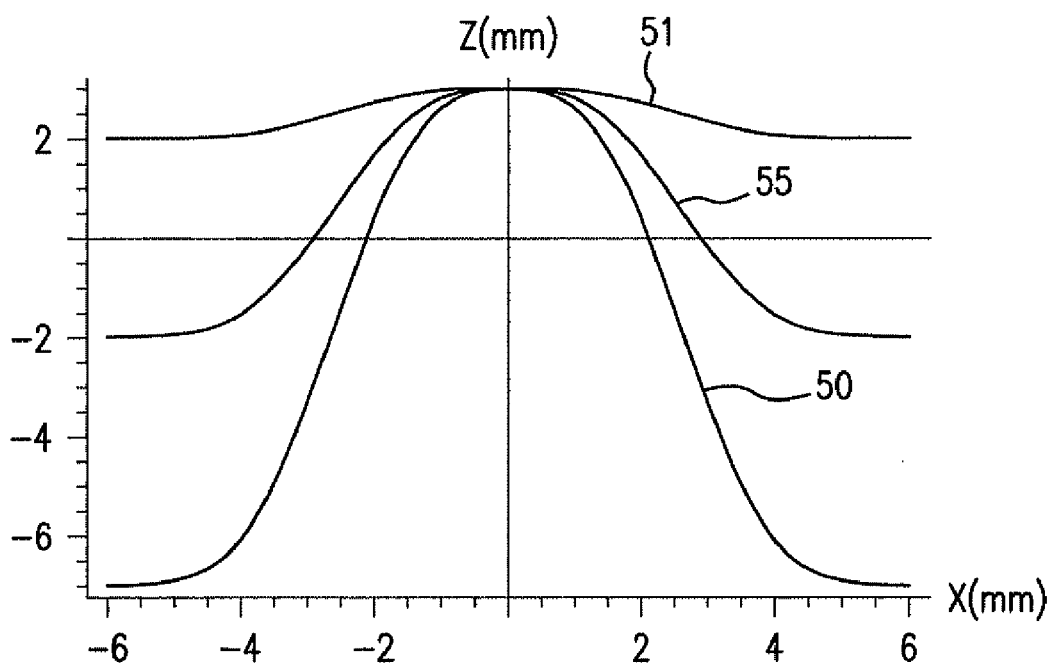
FIG. 5 shows three curves of a modified Super Gaussian equation, each having a different value for the height variable.

FIG. 5 shows three curves according to the third modified Super Gaussian equation, SG3, graphed along the x-axis for clarity. Each curve has a different value for the variable height; curve 51 corresponds to a height of 1 millimeter, curve 55 corresponds to a height of 5 millimeters, and curve 50 corresponds to a height of 10 millimeters. Greater height, in this sense, does not indicate a curve having a greater maximum value in the z-axis, but instead describes the scale factor magnitude of the curve as it extends into the negative z-axis.

Figure 6:
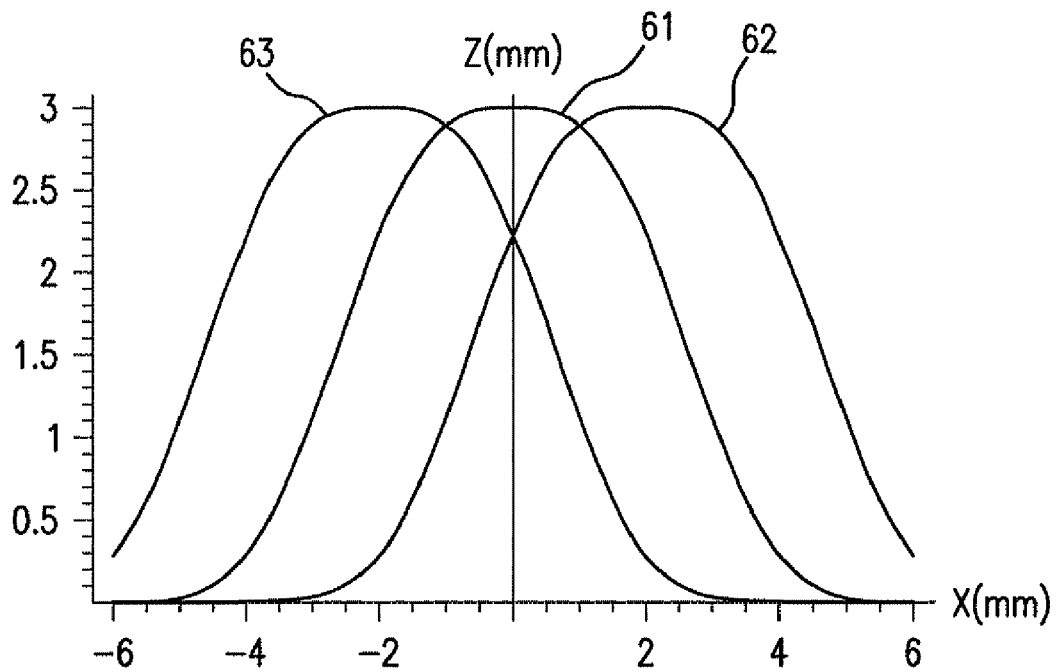
FIG. 6 shows three curves of a modified Super Gaussian equation, each having a different value for the offset variable.
Figure 7A:
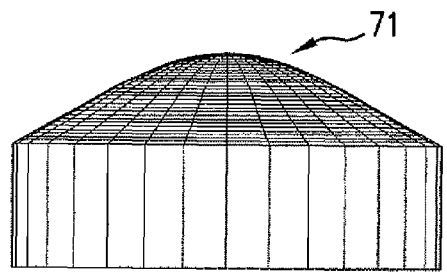
FIGS. 7$a$, 7$b$, 7$c$ and 7$d$ show computer models for exemplary embodiments of the present invention, where only the optic is depicted so as to simplify the view, and where each of the four optics corresponds to a different combination of values for the variables of height, offset and shape.
Figure 7B:
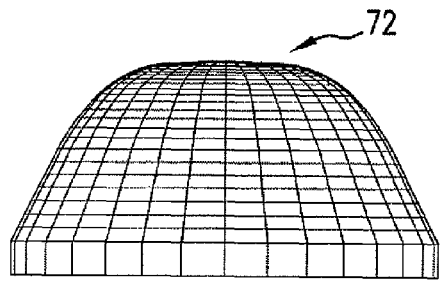
Figure 7C:
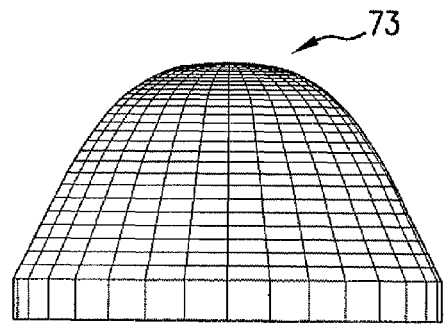
Figure 7D:
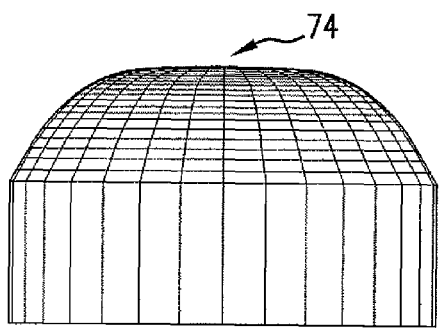

FIG. 6 shows three curves according to the first modified Super Gaussian equation, SG1. Each curve has a different value for the variable offset; curve 61 corresponds to an offset of 0 millimeters, curve 62 corresponds to an offSet of 2 millimeters, and curve 63 corresponds to an offSet of −2 millimeters. When the two-dimensional figure is rotated by 2π radians about the z-axis, only the portion of the curve in the positive quadrant of the x- and z-plane is rotated. Because the offSet variable is indicative of the portion of the curve that rests in this positive quadrant, the offSet variable determines the extent of the curve that is rotated.

FIGS. 7a, 7b, 7c and 7d show a comparison of four lenses, each simulated according to a different set of values for the variables of height, offSet and shape. The values for height, offSet and shape are listed in Table 1.

TABLE 1

Parameters of Lenses of FIGS. 7a, 7b, 7c and 7d

|  | Lens 71 | Lens 72 | Lens 73 | Lens 74 |
| --- | --- | --- | --- | --- |
| Height (mm) | 2 | 4 | 4 | 4 |
| offSet (mm) | 0 | 0 | −0.5 | 0.1 |
| Shape | 2 | 4 | 4 | 4 |

The third modification to the Super Gaussian equation incorporates the standard lens equation. This equation is the Super Gaussian Radial equation (SGR):

$$zSuperGaussianRadial = LensThickness + \alpha \left( \frac{roc - \gamma \sqrt{roc^2 - (1+conic)(x^2+y^2)}}{1+conic} \right) + \beta \, height \times \left( e^{-\left(\frac{|\sqrt{x^2+y^2} - offSet|}{oneOverE}\right)^{shape}} - e^{-\left(\frac{|offSet|}{oneOverE}\right)^{shape}} \right)$$

The SGR equation adds the standard lens equation to the SG3 equation. The SGR equations further incorporates toggle factors α (alpha), β (beta) and γ (gamma). α and β can independently be set to 0 or 1; γ can only be −1 or 1 to allow for the correct direction of the radius of curvature (roc) in the standard lens equation, as described above. These toggle factors determine whether the standard lens equation, the SG3 equation, or the full SGR equation is used. When α=1 and beta=0, the result is the standard lens equation. When α=0 and beta=1, the result is the SG3 equation described above. When α=beta=1, the result is the SGR equation that provides powerful flexibility to the standard lens form.

Additionally, the SGR equation may be modified so as to allow for independent treatment of the x and y axes (SGXY):

$$zSuperGaussianXY = LensThickness + \alpha \left( \frac{roc - \gamma \sqrt{roc^2 - (1+conic)(x^2+y^2)}}{1+conic} \right) +$$
$$\beta \, height \times \left( e^{-\left(\frac{|x-offSet|}{oneOverEx}\right)^{shapex}} \times e^{-\left(\frac{|y-offSet|}{oneOverEy}\right)^{shapey}} - e^{-\left(\frac{|offSetx|}{oneOverEx}\right)^{shapex}} \times e^{-\left(\frac{|offSety|}{oneOverEy}\right)^{shapey}} \right)$$

This leads to a variety of possible shapes for the output, including rectangular and circular, while standard lenses remain limited in radial symmetry.

Using computer modeling programs, an SGR optic can be developed that provides optimized brightness uniformity. As a non-limiting example, such a program may be used to optimize brightness uniformity in a viewing angle of, for example, 20 degrees. A merit function is defined in the program that changes the parameters of the SGR equation (height, offset, shape, oneOverE, lens thickness) until the program finds a combination of parameters that maximizes the amount of light emitted in the 20 degree viewing angle. Once this has been accomplished, another merit function is defined to maximize the uniformity of this light distribution, while also minimizing the amount of light that is emitted outside of the 20 degree viewing angle.

Figure 8:
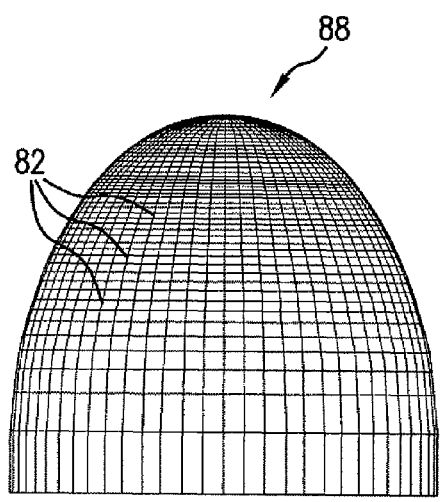
FIG. 8 shows a computer model of a standard lens of the prior art.
Figure 9:
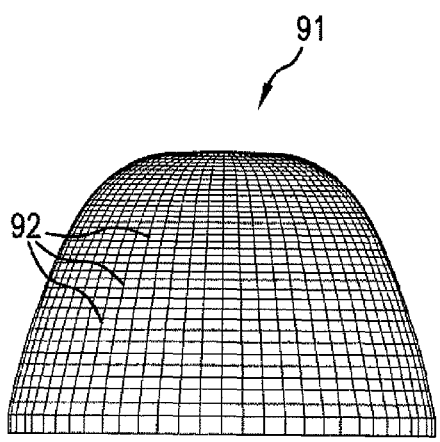
FIG. 9 shows a computer model for an exemplary embodiment of the present invention, where only the optic is depicted so as to simplify the view.
Figure 10:
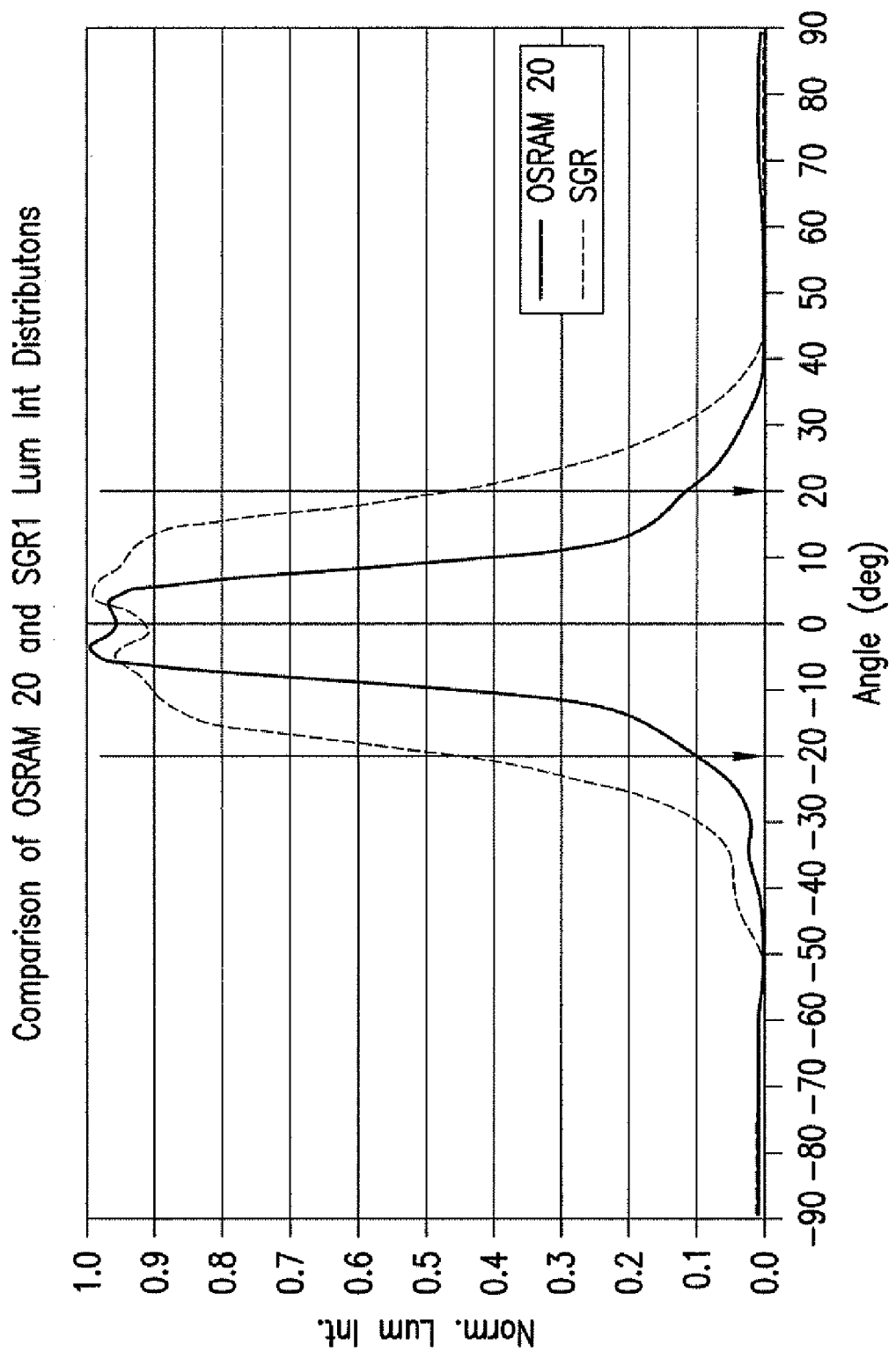
FIG. 10 shows a normalized graph of a comparison of luminous intensity distributions of an exemplary embodiment of the present invention with that of the prior art.
Figure 11A:
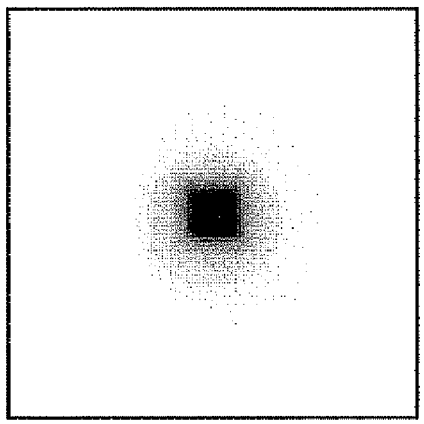
FIGS. 11$a$ and 11$b$ show the output of a standard lens of the prior art and an exemplary embodiment of the present invention, respectively.
Figure 11B:
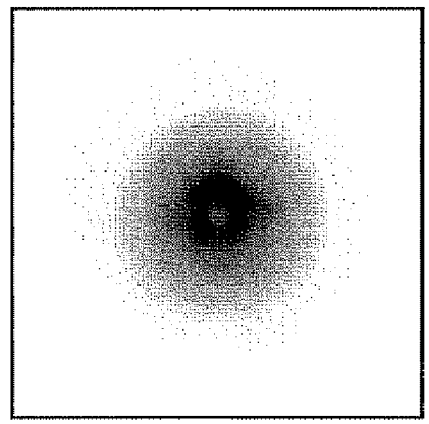

The present invention was compared to a standard optic, an OSRAM Golden Dragon LED with an Argus lens. The Argus lens was simulated in an optical model. The computer program was then used to determine an SGR optic, using the same OSRAM Golden Dragon LED, that would optimize the brightness uniformity within the 20 degree viewing angle. The modeled Argus lens 88 is shown in FIG. 8 having lines of curvature 82. The modeled SGR optic 91 is shown in FIG. 9 having lines of curvature 92. The optimized SGR parameters were determined to be a lens thickness of 4.5 millimeters, a height of 15 millimeters, an offSet of −0.5 millimeters, a oneOverE of 5 millimeters, and a shape of 4.5. As shown in FIG. 10, the normalized radiant luminous intensity of the SGR optic according to the present invention, indicated by the dashed line, provides a more uniform brightness than the Argus lens, indicated by the solid line, throughout the 20 degree viewing angle. The same is also evident in FIGS. 11a and 11b, which show the output of the Argus lens (FIG. 11a) and the SGR optic (FIG. 11b) on a white wall at a distance of 1 meter. The output of the Argus lens is a magnified square image of the 1 square millimeter LED that is emitting the original light. The output of the SGR optic, on the other hand, is a more even, circular distribution.

Figure 12:
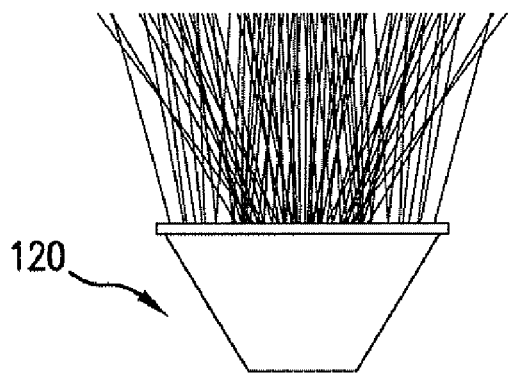
FIG. 12 shows a computer model of a TIR or catadioptric lens of the prior art, with emission of light rays.
Figure 13:
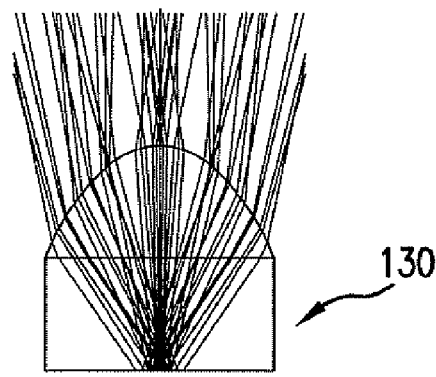
FIG. 13 shows an exemplary embodiment of the present invention, where only the optic is depicted so as to simplify the view, with emission of light rays.
Figure 16A:
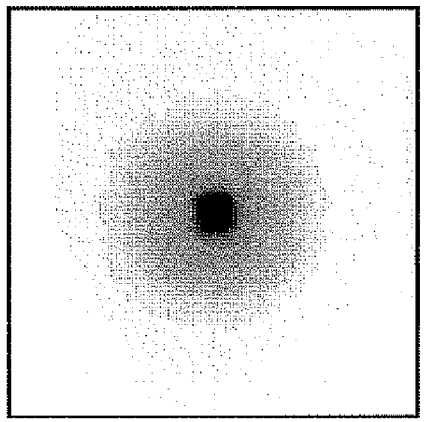
FIGS. 16a and 16b show the output of a standard lens of the prior art and an exemplary embodiment of the present invention, respectively.
Figure 16B:
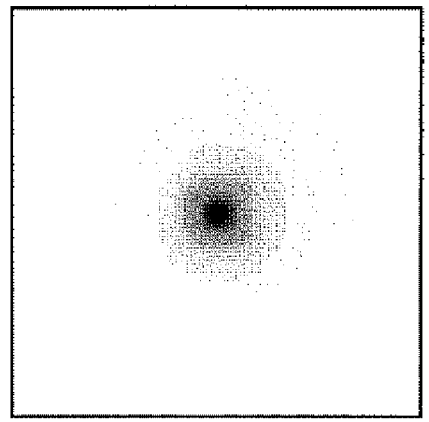
Figure 14:
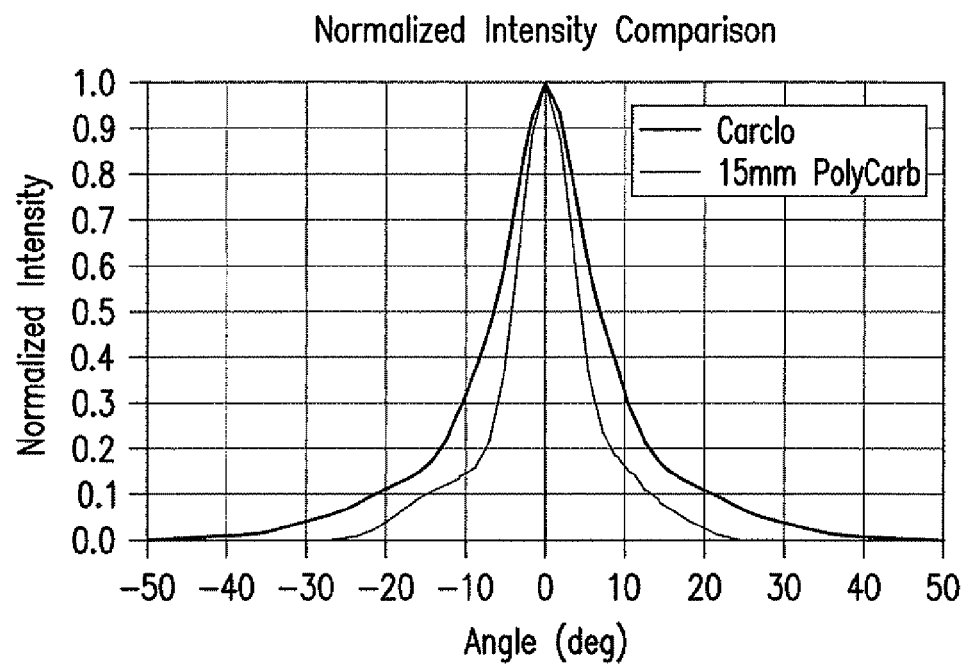
FIG. 14 shows a normalized graph of a comparison of intensity distributions of an exemplary embodiment of the present invention and that of a standard lens of the prior art.
Figure 15:
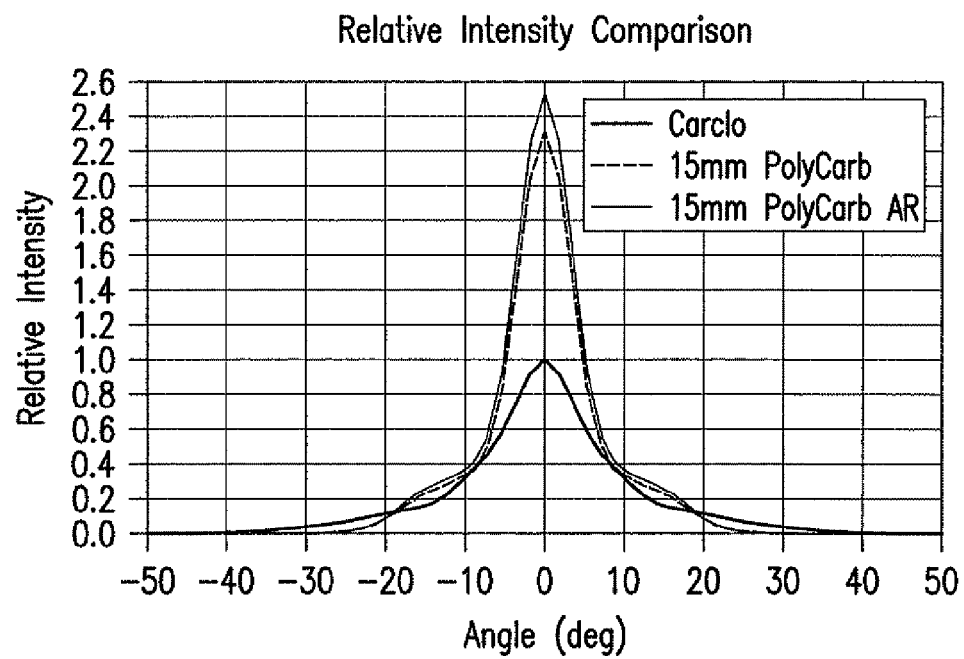
FIG. 15 shows a graph of the relative intensity distribution of an exemplary embodiment of the present invention and that of a standard lens of the prior art.

Similarly, the merit functions of the computer program described above can be set to determine SCR parameters for an SGR optic that optimizes peak brightness. In another non-limiting example, the present invention was compared to an OSRAM Golden Dragon LED with a Carclo 10193 optic. The modeled Carclo 10193 optic 120 is shown in FIG. 12 and the modeled SGR optic 130 is shown in FIG. 13. Both FIGS. 12 and 13 include simulated light rays. The merit function, in this case, is defined to optimize the location of an output power centroid and to minimize the spread of the light ray distribution from the output power centroid. The resulting SCR parameters were found to be a height of 3607.6 millimeters, an offSet of −1.96 millimeters, a oneOverE of 80.84 millimeters, and a shape of 2.9. As shown in FIG. 14, the normalized intensity comparison, the intensity roll-off of the prior art has been significantly reduced by the present invention. Further, as shown in FIG. 15, the relative intensity comparison, the SGR optic 130 of the present invention is at least 2.3 times as bright as the Carclo 10193 optic 120. With the addition of an anti-reflective coating, the SCR optic 130 becomes even brighter—2.5 times as bright as the Carclo 10193 optic 120. The same is evident in FIGS. 16a and 16b, which show the output of the Carclo 10193 optic (FIG. 16a) and the SGR optic (FIG. 16b) on a white wall at a distance of 1 meter. The output of the Carclo 10193 optic shows a pronounced penumbra of wasted light. The output of the SGR optic, on the other hand, shows a smaller circular output of greater brightness and significantly less wasted light.

Merit functions, as described in connection with the computer programs above, may be defined so as to optimize any measurable characteristic of the output of the light source of any of the embodiments of the present invention. Described herein are merit functions based on uniform brightness and peak brightness, however, the present invention is not so limited, and may be used to optimize any characteristic known in the art. For example, the present invention may be used to optimize coupling efficiency into a waveguide, to restrict the number of bounces on an optic, to balance color, or to minimize reflections or ghosting. Further merit functions may be defined so as to optimize any characteristic within a given angular segment. Where the above example was carried out in a 20 degree viewing angle, the same is possible in any other portion of the viewing angle.

As such, the determination of the curve of the optimized SGR optic, as described above, can be used to create an SPO optic. The output of the light source is partitioned into annular regions. The annular regions may be measured in degrees from the central axis of the output of the light source, as well as any other method known in the art. A merit function is defined in the computer program, described above, to optimize the output of a particular annular region. Once the computer program has determined the parameters of the SCR equation that provide an optimized output for a given characteristic, such as, for example, uniform brightness or peak brightness, those parameters are assigned to the segment of the SPO optic that will reflect or refract the output of the light source in accordance with the optimized model. The SPO optic is manufactured so that each segment of the optic has the parameters defined for the annular region to which the segment is associated. Each segment of the optic is thereby configured so as to optimize a characteristic of the output of the light source that contacts it.

It is possible to begin this segmenting process by determining the single-segment optimized curve of an SOR optic, measuring the output from the single-segment optic, and segmenting the output into annular regions. It is further possible to begin this segmenting process with an SPO optic that has previously been developed according to the present invention, and modifying the number or configuration of segments to achieve desired results. Any optic, including an SPO optic, may be modified or further modified according to the present invention.

The present invention is not intended to be limited to an LED. Any light source that is not a point light source, i.e., a broad or extended distribution light source, would be applicable to the disclosed invention.

It is possible to perform this determination of the optimized curve of an SGR optic for each annular region, and to design an SPO optic that incorporates each optimized curve. In this manner, the optic of an embodiment of the present invention may be segmented into as many segments as may be manufactured and formed into a functional optic. As advances in optic manufacture are made, the number of possible segments may increase.

The method of manufacturing the system of the present invention will now be described. Any method of manufacturing an optic known in the art may be compatible with the present invention. The injection molding process for manufacturing an SPO optic will now be described. Once the shape of the SPO optic has been determined, the SPO optic shape is transferred to a metallic tool, such as a router bit. The tool is then impregnated with a fine diamond dust, which provides a protective layer that will resist wear, extending the usable life of the tool. The tool is used to drill or route a precise hole in a panel of any suitable metal known in the art, such as copper or nickel, which are soft enough to allow for quick drilling, yet hard enough to perform the functions of a test optic and mold. This hole is the single cavity mold of the SPO optic shape, and must be drilled or routed in a tightly controlled temperature environment to prevent distortion to the desired features. The mold is then filled with an optical material to form the optic. Optical materials may include any optical materials known in the art, such as, for example, Polymethylmethacrylate (PMMA), Polycarbonate or TOPAS. Multiple molds may be tiled together into a panel to make a master mold for production.

The SPO optic may additionally benefit from having front and back features. To manufacture such an SPO optic, a double cavity mold is employed. The mold is formed by the same method as described above, with the addition of a back mold. The molds are then closed together, optical material is inserted, the optic is formed and then removed from the double cavity mold.

In describing improvements to specific types of standard lenses below, the term Effectiveness Percentage (EP) is defined as the power output between the full width at half maximum (FWHM) points of the luminous intensity curve divided by the total power in the distribution. This term is used herein to quantify useful power, as it is descriptive of the portion of the total power output that is emitted in a specific angular range.

Figure 1A:
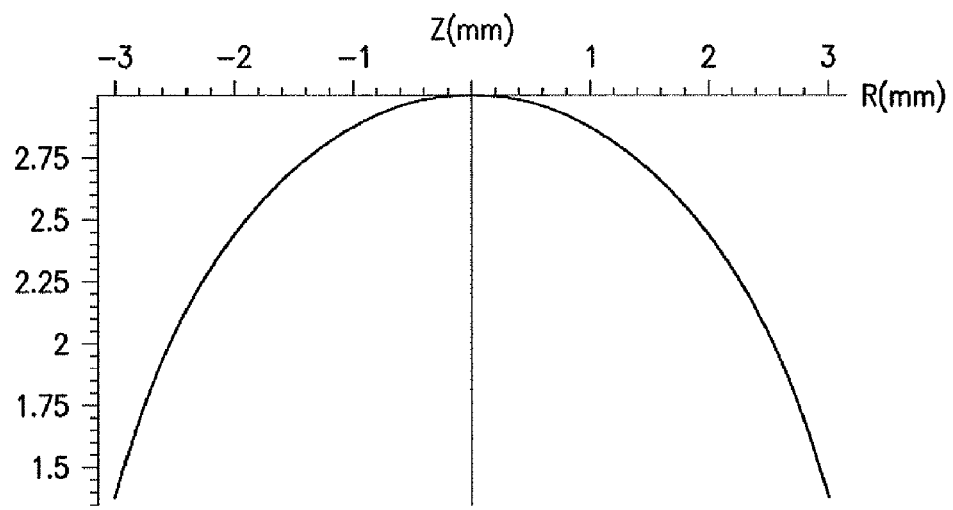
FIG. 1$a$ shows the standard lens curve of the prior art.
Figure 1B:
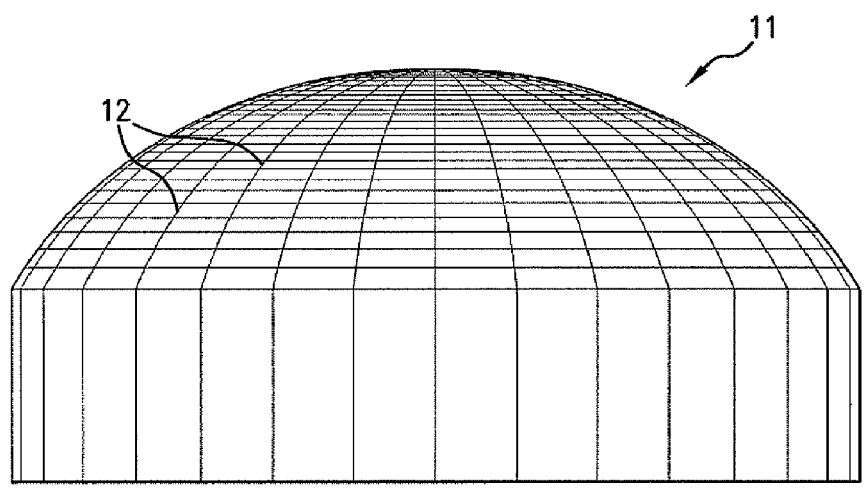
Figure 1C:
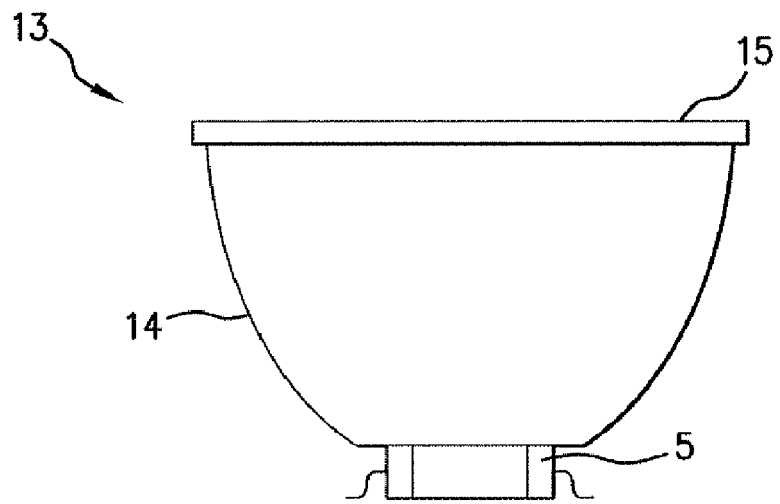
Figure 1D:
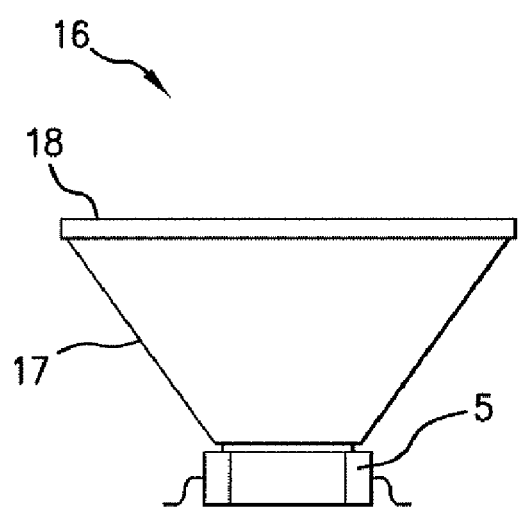

Using the SGR equation, a TIR optic may be developed to provide vastly improved output intensity of a light source. The standard TIR optic of FIG. 1d may be improved in three stages. First, the TIR portion of the may be configured according to the SGR equation. Second, an inner SGR lens, configured according to the SGR equation, may be added to the interior of the TIR optic. Third, an outer SGR lens, configured according to the SGR equation, may be added to the top surface of the TIR optic. Each of these elements may be used to improve the output of the light source; all three elements in combination create the largest improvement.

Figure 17:
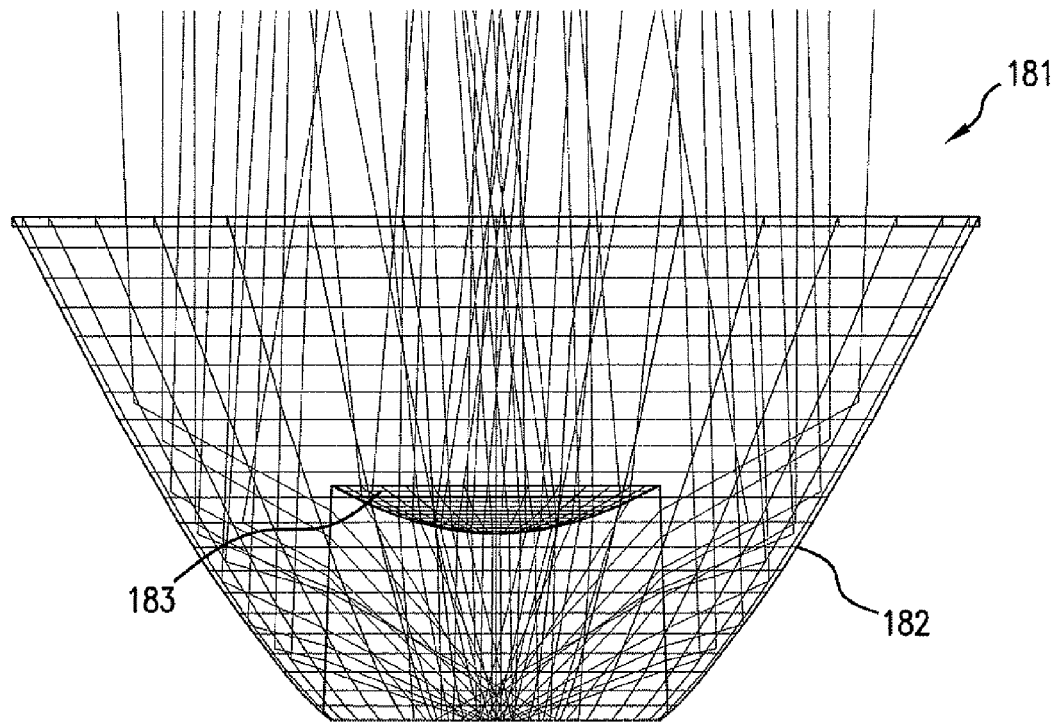
FIG. 17 shows an exemplary embodiment of the present invention having a TIR optic.

FIG. 17 shows the SGRTIR1 optic 181 according to an exemplary embodiment of the present invention. Using the steps described above, a merit function may be defined so as to determine a LensThickness (thickness), a height, an offset, a oneOverE and a shape for an SGR curve for wall 182. The merit function may be bound by certain geometric constraints so as to maintain the relative shape and size of the lens to that of the standard TIR lens. In the next stage, inner SGR lens 183 is added, with a similar merit function defined for the determination of a thickness, a height, an offSet, a oneOverE and a shape for an SGR curve for the inner SGR lens 183.

Figure 18:
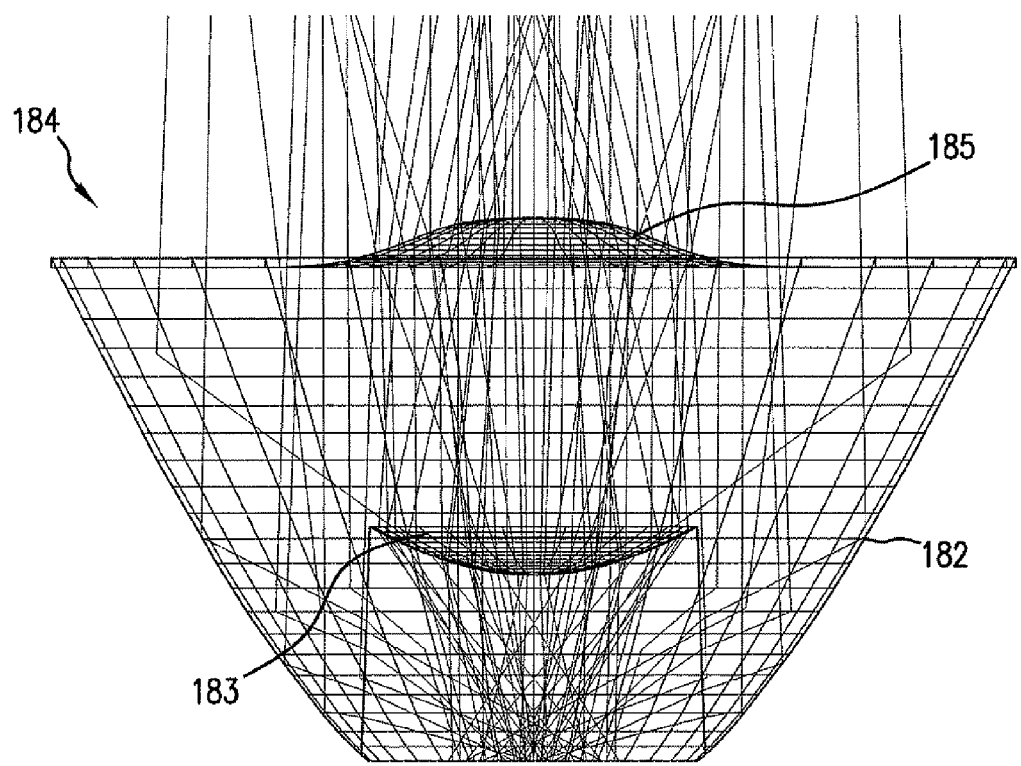
FIG. 18 shows an exemplary embodiment of the present invention having a TIR optic.

FIG. 18 shows the SGRTIR2 optic 184 according to an exemplary embodiment of the present invention. The SGRTIR2 optic 184 is the SGRTIR1 optic 181 of FIG. 18a, with the added feature of an outer SGR lens 185 being provided for the top surface of the SGRTIR2 optic 184. As the three surfaces (wall 182, inner SGR lens 183 and outer SGR lens 185) are described according to the five parameters (thickness, height, offset, oneOverE and shape), a merit function may be defined so as to determine all of the parameters for the SGRTIR1 and SGRTIR2 optics 181 and 184 at the same time.

Table 2 shows the parameters of SGR wall 182, inner SGR lens 183 and outer SGR lens 185 of FIGS. 17 and 18.

TABLE 2

Parameters of SGRTIR1 and SGRTIR2 of FIGS. 17 and 18

|  | SGR Wall 182 | Inner SGR Lens 183 | Outer SGR Lens 185 |
| --- | --- | --- | --- |
| Thickness (mm) | 12 | 1 | 12 |
| Height (mm) | −50 | −20 | 1 |
| offSet (mm) | 1.08 | −0.05293 | 0 |
| oneOverE (mm) | 18.9 | 15 | 3 |
| Shape | 1.732 | 1.993 | 3 |

Figure 19:
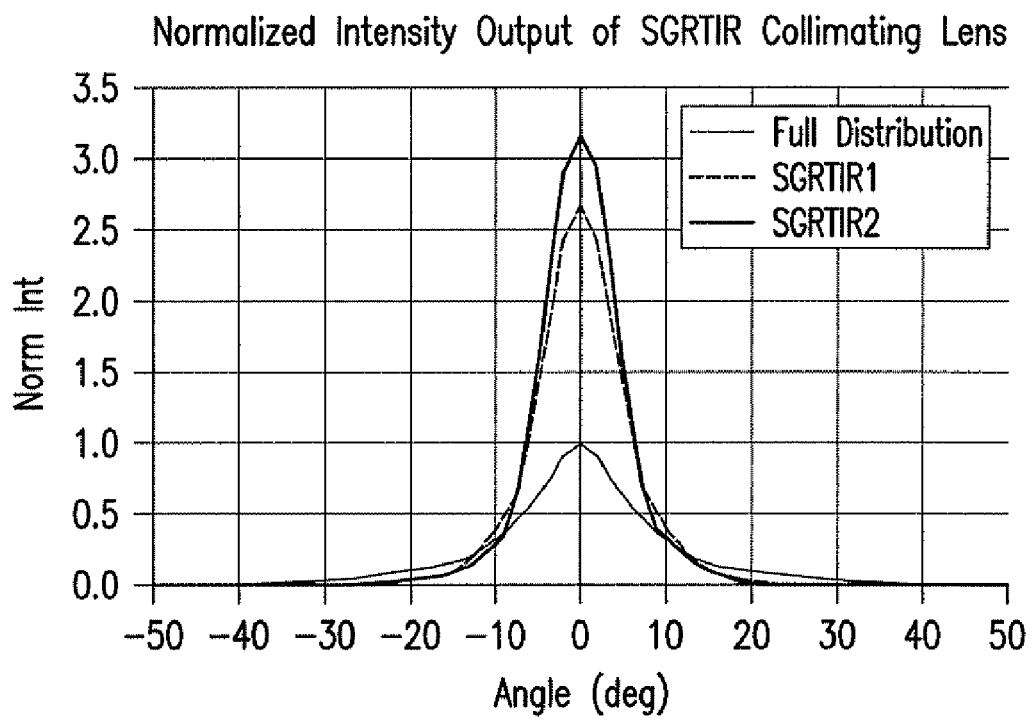
FIG. 19 shows a normalized graph of the intensity output of two exemplary embodiments of the present invention and that of a standard lens of the prior art.

The ray database for the Luxeon K2 LED, similar to the ray database described above for the OSRAM Golden Dragon LED, was used in a computer modeling of the standard TIR lens of the prior art, as well as the SGRTIR1 and SGRTIR2 optics of the present invention. FIG. 19 shows the intensity output of the SGRTIR1 optic of FIG. 17 (indicated by the grey line) and the SGRTIR2 optic of FIG. 18 (indicated by the black line), normalized to the standard TIR lens of the prior art (indicated by the dashed line). The SGRTIR1 optic shows an intensity over 2.5 times that of the standard TIR lens, while the SGRTIR2 optic shows an intensity over three times that of the standard TIR lens.

The output of the SGRTIR2 optic can be categorized according to the reflection from the wall 182 or the refraction through the inner SGR lens 183. Using an SPO optic of at least two segments, the output of the SGRTIR2 optic may be further optimized. Taking the light rays reflected by the wall 182 as one annular region and the light rays refracted by the inner SGR lens 183 as a second annular region, an SPO optic as described above may be implemented in place of outer SGR lens 185. The resulting optic is the SGRTIR3 optic.

Figure 20:
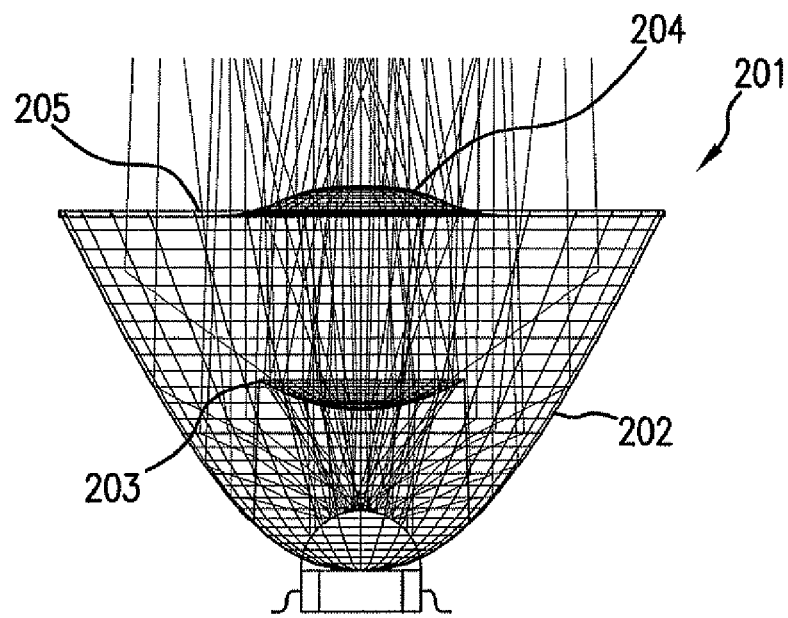
FIG. 20 shows an exemplary embodiment of the present invention having a TIR optic.

Using the computer modeling process described above, the SGRTIR3 optic of the present invention was compared to the standard TIR optics Carclo 60318, having a diameter of 20 millimeter, and Carclo 60367, having a diameter of 26.5 millimeters. The SGRTIR3 optic was constrained to 20 millimeters in diameter, the size of the smaller standard TIR lens. FIG. 20 shows SGRTIR3 optic 201 according to an exemplary embodiment of the present invention. SGRTIR3 optic 201 has SGR wall 202, inner SGR lens 203 and outer SPO lens 206. Outer SPO lens 206 has two segments, 204 and 205. The parameters of SGRTIR3 optic 201 are listed in Table 3.

TABLE 3

Parameters of SGRTIR3 Optic of FIG. 20

|  | SGR Wall 202 | Inner SGR Lens 203 | Outer SGR Lens Segment 204 | Outer SGR Lens Segment 204 |
| --- | --- | --- | --- | --- |
| Thickness (mm) | 10.5 | 6.45 | 6.45 | 10.5 |
| Height (mm) | −49.1 | −20 | 1 | −1 |
| offSet (mm) | 1.24 | −0.05293 | 0 | 4.4 |
| oneOverE (mm) | 19.6 | 15 | 2.738 | 12 |
| Shape | 1.7039 | 1.993 | 2.551 | 1.8 |

The outputs of SGRTIR3 were measured and the EP was calculated. The calculated UP was 37.50% for the Carclo 60318, 41.44% for the SGRTIR2 optic, 41.64% for the Carclo 60367, and 57.40% for the SGRTIR3 optic. While the larger Carclo 60367 optic is able to direct light emission from the LED more efficiently than the smaller Carclo 60318 optic, the SGTIR3 optic is able to best it while maintaining a small size. The ability to produce such efficient light output while maintaining such small size allows for more freedom in the use of and design of systems including the optic of the present invention.

In a further embodiment of the present invention, a TIR lens may be optimized to emit an output of a specific shape. A user may require a very narrow output, for example, for use in fiber optics. In this case, the merit function would be defined so as to minimize any deviation of light rays from the power centroid. As a non-limiting example, a user could specify that the output of the optic could converge into as small of a spot as possible at a given distance.

Figure 21:
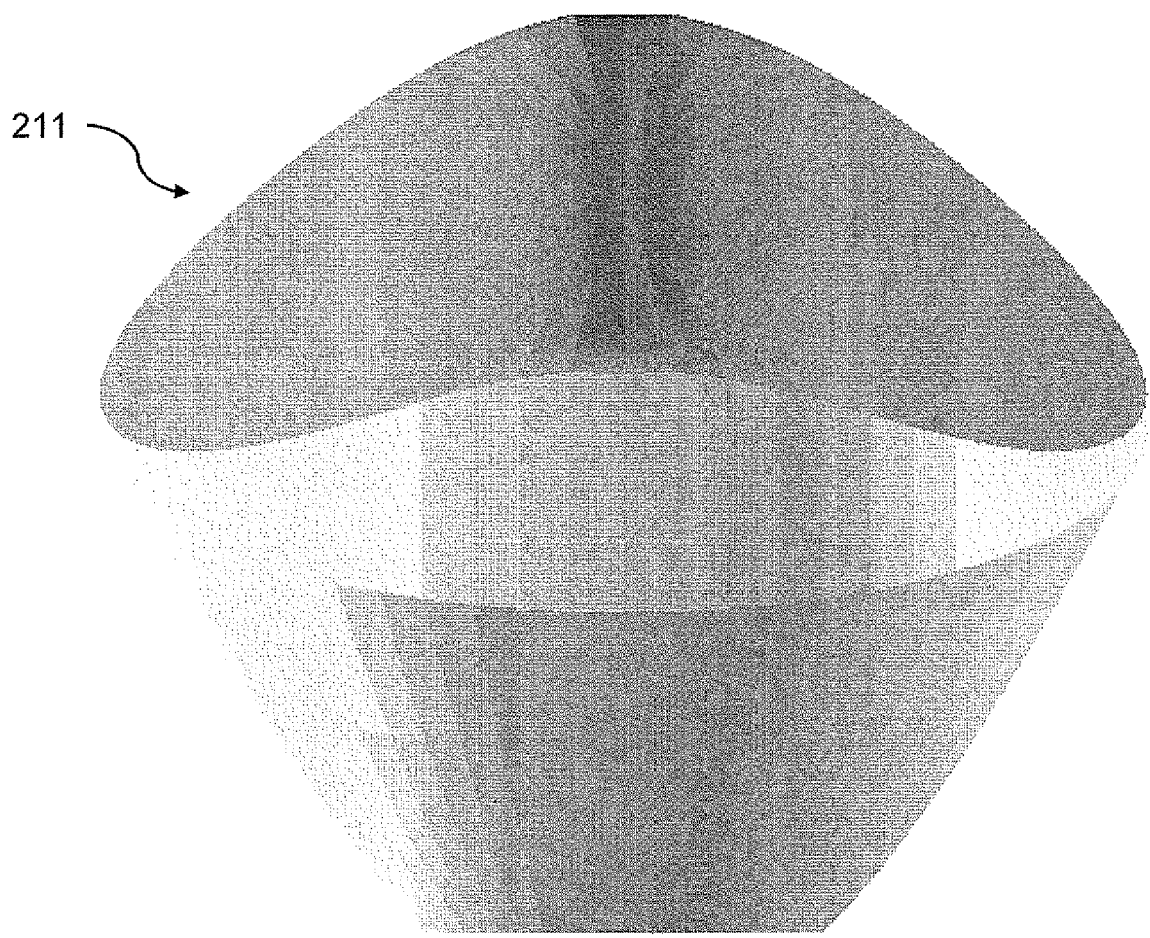
FIG. 21 shows a three-dimensional rendering of an exemplary embodiment of the present invention having radial asymmetry.
Figure 22:
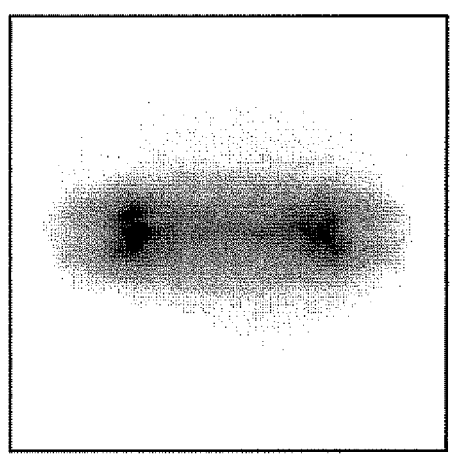
FIG. 22 shows the output of an exemplary embodiment of the present invention having radial asymmetry.

Alternatively, the SGXY equation can be used and adjusted independently for the x- and y-axes, so that SGR optics are not limited to radial symmetry. A user may require an elongated, rectangular output, in which case the variables for offset, oneOverE and shape may be determined independently for the x- and y-axes, yielding additional parameters offSetX, offSetY, oneOverEX, oneOverEY, shape X and shape Y. A non-limiting example of this configuration is depicted in FIG. 21. SGRXY optic 211 has a thickness of 5 millimeters and a height of 8 millimeters. OffSetX and offSetY are both 0.54 millimeters and oneOverEX and oneOverEY are both 11 millimeters. ShapeX and shapeY, however, are not equal; shapeX is 20, while shapeY is 1.564. FIG. 22 shows the output of the SGRXY optic 211 of FIG. 21 on a white wall at a distance of 1 meter. Other configuration of the parameters along the x- and y-axes will yield differently shaped outputs, and the lens of the present invention may be adjusted by the user as required.

Figure 23:
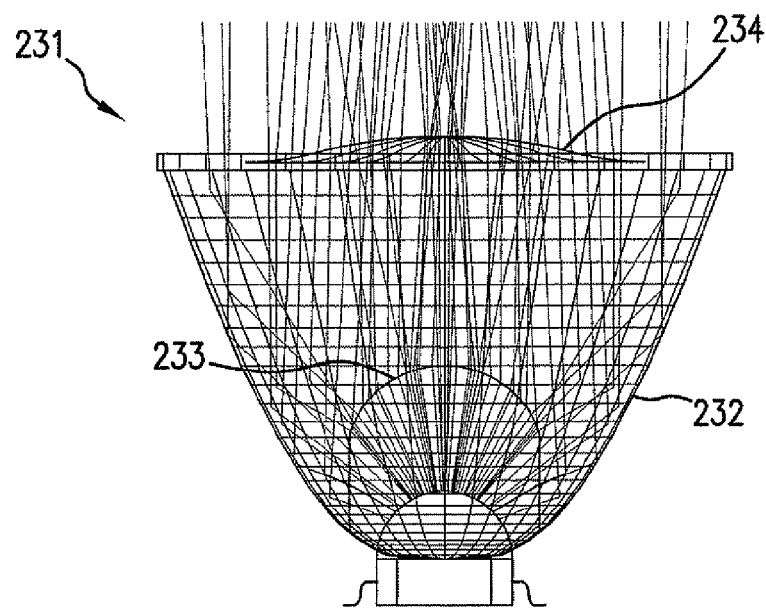
FIG. 23 shows an exemplary embodiment of the present invention having a reflector optic.

Using the SGR equation, a reflector optic may be developed to provide vastly improved output intensity of a light source. Similarly to the improvements on the standard TIR lens described above, the standard reflector lens of FIG. 1c may be improved in three stages. First, the reflector portion of the may be configured according to the SOR equation. Second, an inner SGR lens, configured according to the SGR equation, may be added to the interior of the reflector optic. Third, an outer SGR lens, configured according to the SGR equation, may be added to the top surface of the reflector optic. Each of these elements may be used to improve the output of the light source; all three elements in combination create the largest improvement. The parameters of each of the reflector portion, the inner SGR lens and the outer SGR lens may be optimized at the same time. The result is the SGR reflector optic 231 of FIG. 23, having SGR wall 232, inner SGR lens 233 and outer SGR lens 234. Outer SGR lens 234 may also be an SPO lens, where reflected light from SGR wall 232 forms a first annular region and refracted light from inner SGR lens 233 forms a second annular region.

SGR wall 232 may be formed in any manner known in the art. Specifically, SGR wall 232 may be formed by a casting process, in aluminum, and then applying a reflective metal to the surface. The reflective mirror may also be molded in plastic, and then have a reflective metal applied to the surface.

Inner SGR lens 233 and outer SGR lens 234 may be formed in any manner known in the art, including, specifically, the injection molding process described above.

Outer SGR lens 234, which in this case acts as a cover plate for the SGRReflector optic, may also be made by a hot embossing technique. A polycarbonate of PMMA is first heated, then rolled under a metal cylinder, the metal cylinder having molds bored into it. Once the lens cools, it can be cut out and applied to the SGRReflector optic 231.

For the purposes of modeling the output of an improved reflector lens, the ray database from a domed LED Luxeon K2 was used. A standard reflector design was measured from an LED flashlight. In the same manner as fully set forth above, the calculated EP for the standard reflector optic was 14.69%, whereas the EP for the SGRReflector optic was measured as 54.30%.

Figure 24:
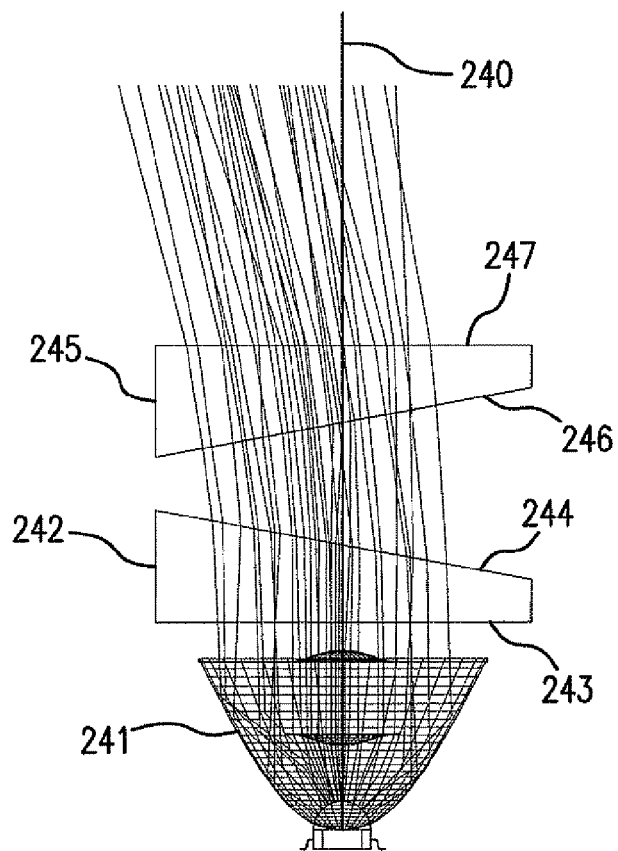
FIG. 24 shows an exemplary embodiment of the present invention having a TIR optic and two beam steering prisms.

In a further exemplary embodiment of the present invention, beam steering prisms may be incorporated so as to provide a variety of output patterns. As shown in FIG. 24, first beam steering prism 242 and second steering prism 245 are situated in front of the output of SGR/SPO optic 241. SGR/SPO optic 241 may be any of the optics described according to the present invention. First beam steering prism 242 has front face 243 and back face 244. Second beam steering prism 245 has front face 246 and back face 247. Faces 243, 244, 246 and 247 may be set at any angle with respect to central axis 240 so as to direct the emission from SGR/SPO optic 241. First and second beam steering prisms 242 and 245 may be rotated about central axis 240 so as to steer the emission from SGR/SPO optic 241 in a desired manner.

By rotating the first and second beam steering prisms 242 and 245, a user may more accurately direct the emission from SGR/SPO optic 241 to a particular spot. Further, if the rotation of the first and second beam steering prisms 242 and 245 is carried out at a frequency on the order of about at least 30 Hz, the resulting output will appear to the human eye to be a continuous pattern of illumination.

Figure 25A:
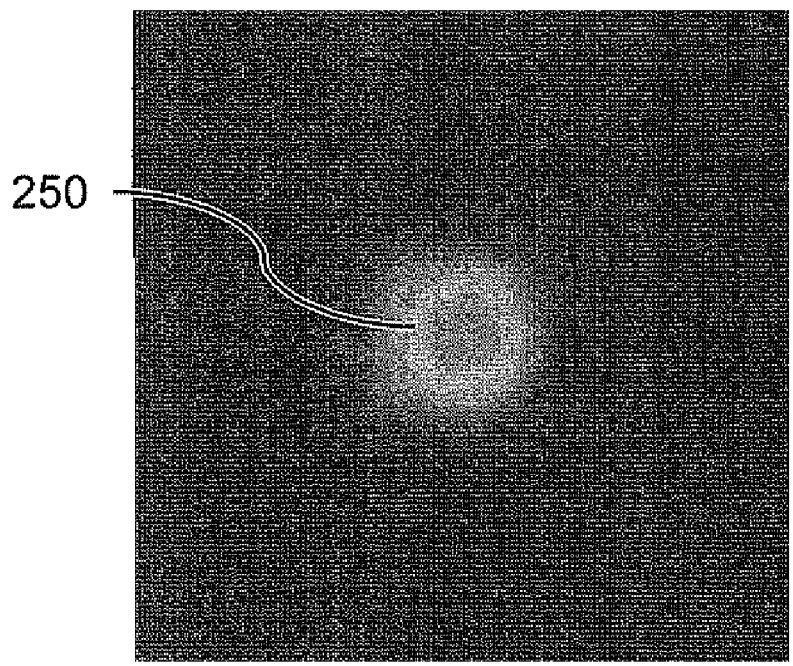
FIGS. 25a and 25b show the output of an exemplary embodiment of the present invention having a TIR optic and two beam steering prisms.
Figure 25B:
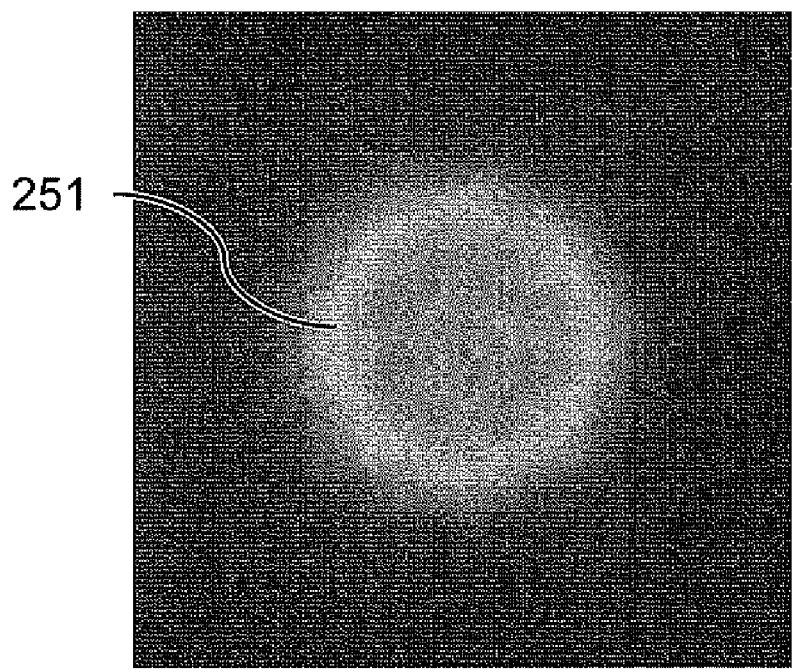

FIGS. 25a and 25b shows the output on a screen at 10 meters, when the first and second beam steering prisms are set to seven degrees about the central axis of an SGRTIR3 optic. FIG. 25a represents the output on the screen when the prisms are not being rotated, depicted by stationary luminance spot 250. FIG. 25b represents the output in the screen when the prisms are rotated at a frequency on the order of about 40 Hz, depicted by rotating illuminance spot 251. Rotating illuminance spot 251 shows a much wider range than stationary illuminance spot 250. The measured EP for the SGRTIR3 optic was 49.7%, however, with the addition of the rotating beam steering prisms, the measured EP rises to 91.4%, indicating that very little light is wasted.

Though the exemplary embodiments of the present invention have been described using LEDs having Lambertian emission, other light sources may be used in accordance with the present invention. For example, SPO optics may be used to direct light from fiber optics or other waveguides. Such light sources appear as extended source LEDs but have output emissions limited to a more narrow angle (on the order of about 50 to 60 degrees).

What is claimed is:

1. A system for segmented parametric optimization of emissions from a light source, comprising:
   a light source emitting light rays at a plurality of angles; and
   an optic for directing light rays from the light source, the optic including at least one annular segment, the at least one annular segment being defined according to a curve, the curve configured as a function of variables shape, height, and offSet to maximize a characteristic of the emitted light rays;
   wherein the variable shape comprises a numerical value that determines a shape of the curve, the variable height comprises a scale factor of the curve, and the variable offSet comprises a distance by which a bisection of the curve is displaced from a center axis of the at least one annular segment.

2. The system of claim 1, wherein the light source includes a light-emitting diode.

3. The system of claim 1, wherein the optic includes at least one angular segment being reflecting.

4. The system of claim 1, wherein the optic includes at least one annular segment being a total internal reflector.

5. The system of claim 1, wherein the optic includes at least one annular segment being refracting.

6. The system of claim 1, wherein the optic includes at least one annular segment being reflecting and at least one annular segment being refracting.

7. The system of claim 1, wherein the at least one annular segment is configured according to a Super Gaussian Radial curve.

8. The system of claim 1, wherein the optic is radially asymmetric.

9. The system of claim 1, wherein the characteristic optimized by the configuration of the at least one annular segment is at least one of uniform brightness, peak brightness, coupling efficiency, number of bounces of light on the optic, color balance, reflections and ghosting.

10. The system of claim 1, wherein the optic is made of one of PMMA and polycarbonate.

11. The system of claim 1, wherein the optic includes a front face and a back face, the front and back faces each including the at least one annular segment.

12. The system of claim 1, further comprising a first beam steering prism and a second beam steering prism situated downstream of the output of the optic, the first and second beam steering prisms each having a front face and a back face, the front and back faces of the first and second beam steering prisms being situated at an angle to the central axis of the system.

13. The system of claim 12, wherein the first and second beam steering prisms are mechanically rotated about the central axis.

14. A method for configuring an optic for segmented parametric optimization of emissions from a light source, comprising:
   measuring emissions from a light source;
   compiling data measured into a ray database;

defining a merit function for the optimization of a characteristic of the emissions from the light source;
modeling an output of an optic whose shape is defined by a parameterized curve having at least one annular segment;
varying parameters of the parameterized curve of each of the at least one annular segment;
measuring the modeled output until the characteristic is optimized; and
forming an optic according to optimal parameters of the at least one annular segment of the parameterized curve.

15. The method of claim 14, wherein the step of varying the parameters of the parameterized curve of the at least one annular segment is performed on more than one of the at least one annular segment simultaneously.

16. The method of claim 14, wherein the step of forming an optic according to optimal parameters of the at least one annular segment of the parameterized curve further includes forming the optic with a reflective wall and at least one refractive lens.

17. A system for segmented parametric optimization of emissions from a light source, comprising:
a light source emitting light rays at a plurality of angles; and
an optic for directing light rays from the light source, the optic including at least one annular segment, the at least one annular segment being defined according to a curve, the curve configured as a function of variables LensThickness, shape, height, oneOverE, and offSet;
wherein the variable LensThickness comprises a thickness of the optic, the variable shape comprises a numerical value that determines a shape of the curve, the variable height comprises a scale factor of the curve, the variable oneOverE comprises a numerical value indicating a convergence point for curves having differing numerical values for the shape variable, and the variable offSet comprises a distance by which a bisection of the curve is displaced from a center axis of the at least one annular segment.

* * * * *

UNITED STATES PATENT AND TRADEMARK OFFICE
CERTIFICATE OF CORRECTION

PATENT NO. : 8,310,685 B2
APPLICATION NO. : 12/191746
DATED : November 13, 2012
INVENTOR(S) : Klaus-Peter Dimitrov-Kuhl et al.

It is certified that error appears in the above-identified patent and that said Letters Patent is hereby corrected as shown below:

In the Specifications:

In column 4, line 51, please change "offset" to --offSet--

In column 4, line 56, please change "offset" to --offSet--

In column 6, line 7, please change "rays 36' and 37" to --rays 36' and 37'--

In column 6, line 38, please change "offset" to --offSet--

In column 6, line 52, please change "x-offset" to --x-offSet--

In column 6, lines 52-53, please change "value of x-offset" to --value of x-offSet--

In column 7, line 41, please change "variable offset" to --variable offSet--

In column 7, line 41, please change "to an offset" to --to an offSet--

In column 8, line 31, please change $+\beta \text{height} \times \left( e^{-\left(\frac{|x - \text{offset}|}{\text{oneOverEx}}\right)^{\text{shapex}}} \right)$ to $+\beta \text{height} \times \left( e^{-\left(\frac{|x - \text{offSet}|}{\text{oneOverEx}}\right)^{\text{shapex}}} \right)$ In column 8, line 31, please change $\times e^{-\left(\frac{|y - \text{offset}|}{\text{oneOverEy}}\right)^{\text{shapey}}}$ to $\times e^{-\left(\frac{|y - \text{offSet}|}{\text{oneOverEy}}\right)^{\text{shapey}}}$ In column 8, line 46, please change "lens thickness" to --Lens Thickness--

Signed and Sealed this
Twenty-eighth Day of May, 2013

Teresa Stanek Rea
*Acting Director of the United States Patent and Trademark Office*

CERTIFICATE OF CORRECTION (continued)
U.S. Pat. No. 8,310,685 B2

In column 8, line 62 , please change "lens thickness" to --Lens Thickness--

In column 11, line 10, please change "an offset'" to --an offSet--

In column 11, line 25, please change "offset" to --offSet--

In column 12, line 23, please change "UP" to --EP--

In column 12, line 45, please change "offset" to --offSet--